United States Patent [19]

Koshak et al.

[11] 3,876,566

[45] Apr. 8, 1975

[54] METHOD PRODUCING FOAMED THERMOPLASTIC COMPOSITIONS

[75] Inventors: James A. Koshak, Lisle; William R. McGuire, Woodridge, both of Ill.

[73] Assignee: Standard Oil Company, Chicago, Ill.

[22] Filed: Nov. 13, 1972

[21] Appl. No.: 305,663

[52] U.S. Cl. ...... 260/2.5 HA; 260/2.5 R; 260/2.5 E; 117/128.4; 260/92.8 A; 260/94.9 GD; 260/876 B; 260/878 B
[51] Int. Cl. ............................................. C08f 47/10
[58] Field of Search .......... 260/2.5 E, 2.5 R, 561 H, 260/2.5 HA

[56] References Cited
UNITED STATES PATENTS

| | | | |
|---|---|---|---|
| 2,621,161 | 12/1952 | Kulp et al. | 260/2.5 R |
| 2,825,282 | 4/1958 | Gergen et al. | 260/2.5 R |
| 3,503,802 | 3/1970 | Yoshida et al. | 260/2.5 HA |

Primary Examiner—Wilbert J. Briggs, Sr.
Attorney, Agent, or Firm—Robert R. Cochran; Arthur G. Gilkes; William T. McClain

[57] ABSTRACT

Improved foamed or cellular thermoplastic articles are obtained by incorporating in a conventional recipe for producing such articles a compound of the formula $R-CO-NH-NH-CO-(CH_2)_n-CO-NH-NH-CO-R'$, where R and R' independently are alkyl groups containing up to 4 carbon atoms and $n$ is an integer of 1 to 8, the addition of said compound serving to produce a cellular article of reduced specific gravity. An example of a specific additive found to have good results is N, N'-diacetyl-adipic dihydrazide, sometimes referred to as N, N'-diethanoyladipic dihydrazide. Foamed articles produced by the process disclosed have lower specific gravities than obtained with prior art additives.

9 Claims, No Drawings

METHOD PRODUCING FOAMED THERMOPLASTIC COMPOSITIONS

FIELD OF THE INVENTION

This invention relates to the production of foamed or cellular articles as exemplified by wire coatings, profiles, and tubular shapes. Many additives have been suggested for use in the production of such compositions. The present invention is based upon the discovery that compositions of reduced specific gravity can be obtained by the use of the additives disclosed.

DESCRIPTION OF PRIOR ART

Certain additives of the type disclosed are known in the art and a general description thereof is set forth in West German Application 2,124,641 in the name of CIBA-Geigy A.G.

SUMMARY OF THE INVENTION

Broadly, our invention relates to an improved process for the production of cellular thermoplastic articles wherein the thermoplastic resin is mixed with a blowing agent and heated to activate said blowing agent, the improvement comprising incorporating in said resin a compound of the formula R—CO—NH—NH—CO—$(CH_2)_n$—CO—NH—NH—CO—R', where R and R' independently are alkyl groups containing up to 4 carbon atoms and $n$ is an integer of 1 to 8, the addition of said compound serving to produce a cellular article of reduced specific gravity and improved cellular structure at a given blowing agent level. Specific compounds coming within the broad scope of this invention include the following: N,N'-diethanoyl-malonic dihydrazide, N-propanoyl-N'-butanoyl-succinic dihydrazide, the isomers of N,N'-pentanoyl-glutaric dihydrazide, N,N'-diethanoyl-adipic dihydrazide, N,N'-propanoyl-palemic dihydrazide, N,N'-butanoyl-suberic dihydrazide, N-ethanoyl-N'-propanoyl azelaic dihydrazide, N,N'-diethanoyl-sebacic dihydrazide, etc.

The amount of dihydrazide additive varies depending on such factors as the type and level of blowing agent and the polymer being blown. The broad range of 0.05 to 0.6 weight percent can be used, but the lower portion of this range, up to 0.3 weight percent, is preferred.

Our invention is applicable to the production of foamed or cellular products from thermoplastic materials broadly, but we believe it will find its greatest application with resins such as polyethylene of low, medium or high densities, polypropylene block copolymers of ethylene and propylene, and other polymers of mixtures of lower 1-olefins, poly (vinyl chloride) and polystyrene. For wire coating, a block copolymer of ethylene and propylene with a flow rate of 0.5 to 2.5 g/10 minutes (ASTM D-1238, Procedure A, Condition L) is especially desired. For such extrusion, temperatures in the range of 375° to 450°F. are normally used.

The use of the additives disclosed herein in these resins produces a more consistent product and improves the overall foamability thereof. The more one can expand the polymer and maintain the desired properties, the greater the economic value since an equivalent product can be obtained with less material. Prior art foamed coatings, and particularly those on wire, had a reduction in specific gravity from the base resin of generally somewhat under 50 percent. The use of the present process permits one to obtain reductions in specific gravity in the range of at least 60 to 70 percent. This is a distinct advantage to the user, permitting savings in material cost, shipping cost, etc. Another advantage is that less blowing agent is required to obtain a foam of equal density.

Other than the particular additives which constitute the subject matter of our invention, the compositions are conventional. Thus, in many cases, they will contain a conventional stabilizer package to improve processing and resistance to oxidation. The technology on the selection of such a package is well known and does not constitute a feature of our invention.

In like manner, many blowing agents are commercially available and the selection of a particular blowing agent or combination thereof depends upon the particular thermoplastic polymer and the processing characteristics, primarily the blowing temperature, desired. Specific examples of suitable blowing agents include azodicarbonamide, p-toluene sulfonyl semicarbazide, and p,p+-oxybis (benzene sulfonyl hydrazide). Such chemical blowing agents are p,p'used in amounts of 0.1 to 5 percent by weight. In addition to these chemical blowing agents, gases and volatile liquids such as nitrogen, $CO_2$, Freon compounds, and pentane are also frequently used.

The compositions can be made by a variety of procedures, although this is most frequently done by preparing a masterbatch of the additive with the polymer and then blending this masterbatch with additional raw polymer. Specifically, we prefer to make a masterbatch of the stabilizer package and the dihydrazide of the present invention and to blend this with additional polymer. Thereafter, the blowing agent is added. One convenient method for doing this is to coat the pellets with a tacky material such as a low molecular weight polyisobutylene or mineral oil, and to tumble the coated polymer pellets with the blowing agent.

In the production of the foamed articles, the resulting polymer, containing all of the additives, is extruded under conditions such that the foaming occurs as the thermoplastic material exits from the extruder die.

The following examples illustrate specific embodiments of our invention, but they should not be considered unduly limiting:

EXAMPLE 1

This example illustrates the method of our invention, in which a wire is coated with a foamed polymer composition, and illustrates the lower specific gravity or increased expansion obtained using this method.

The polymer used was polypropylene having an attached terminal propylene/ethylene copolymer block having a flow rate of approximately 1.8 g./10 minutes, the test method being ASTM D-1238, Procedure A, Condition L. Other properties included a density of approximately 0.900, a tensile strength of approximately 4,000 lbs./sq. in., an elongation of greater than 200 percent, and a dielectric constant of 2.24. The polymer was mixed with one part by weight of a conventional stabilizer package and 0.4 percent by weight of Kempore 125, an azodicarbonamide blowing agent.

Two compositions were prepared for extrusion, a control containing 0.4 percent by weight of oxanilide (N,N'-diphenyloxamide), a common additive for such compositions while, to illustrate the invention, the second polymer contained 0.2 weight percent of N,N'-diacetyladipic dihydrazide.

Each of the polymer compositions was masterbatched with all of the additives, except the blowing agent, in a ribbon blender and then pelletized. The resulting pellets were coated with a blowing agent by first tumbling the pellets 30 minutes with 0.375 weight percent of a 20 weight percent solution of low molecular weight polyisobutylene in perchloroethylene. The blowing agent was added and tumbling continued for 1 hour. This masterbatch was then mixed with uncompounded polypropylene to give the final product having the weight percent additives set forth above.

Wire was coated with each of the compositions, using a Model 25T extruder made by Davis Standard/Goulding Division of Crompton and Knowles Corporation of Pawcatuck, Conn. This is a conventional extruder used for wire coating and has a 2½ inch diameter barrel, with a length-to-diameter ratio of 24:1. The mixing screw is cored for screw cooling.

To ensure careful control of the operation, the extruder is under automatic control of instruments to monitor continuously capacitance and diameter. The instruments for the latter control are commercially available from Measuring Instruments Controls, Inc., Berkley Heights, N.J., the capacitance measuring head being Model KD 500 and the diameter measuring head being Model T 500. The machine conditions were as set forth in the following Table:

MACHINE CONDITIONS

|  | Control | Invention |
|---|---|---|
| Conductor Size (Diam. 0.025") | # 22 AWG | # 22 AWG |
| Diam over Dielectric | 0.036" | 0.035" |
| Die Orifice | 0.040" | 0.040" |
| Heater Settings, °F. |  |  |
| Zone 1 | 380 | 380 |
| Zone 2 | 400 | 400 |
| Zone 3 | 410 | 410 |
| Zone 4 | 420 | 420 |
| Zone 5 | 435 | 435 |
| Melt Temperature, °F. | 420 | 420 |
| Head Temperature, °F. | 430 | 430 |
| Line Speed, fpm | 2500 | 2500 |
| Screw Speed, rpm | 25 | 25 |
| Wire Preheat, °F. | 295 | 295 |
| Screw Cooling, °F. | 190 inlet | 190 inlet |
| Capacitance, pf | 74 | 74 |

From the above Table, it will be seen that conditions were identical for the control and the composition of our invention and that the difference in density, subsequently described, must reside solely in the use of the particular additive.

Portions of wire were stripped of their insulation and the weight of the polymer determined. The following formula was used:

$$W = 1.360 (D_w + D_I) D_I (Sp. Gr.)$$

where

W = weight of polymer on conductor in pounds/ft
$D_w$ = diameter of conductor
$D_I$ = wall thickness of insulation
Sp. Gr. = specific gravity of insulation The diameter of the conductor was 0.025 inch and the wall thickness of the foamed polypropylene for the control run was 0.0055 inch. For the invention, the wire diameter was the same and the wall thickness of the insulation was 0.0050 inch. The weight of the control run polymer was 0.0499 gram and was 0.0227 gram for the invention. Using the above equation, the specific gravity, respectively, for these compositions is then 0.495 and 0.27. Calculation from the specific gravity of the polymer (0.900), it will be apparent that the control gave a 45 percent expansion, while the composition with the N,N'-diacetyl-adipic dihydrazide gave an expansion of 70 percent. This illustrates a definite advantage for the use of such dihydrazides in the process.

EXAMPLE 2

An uncompounded, commercial poly (vinyl chloride) polymer, normally used for pipe and profile extrusions, was compounded with 0.1 percent by weight of N,N'-diacetyl-adipic dihydrazide and a control made with no additive. Each of these compositions was identically coated with a combination of blowing agents, 0.2 percent by weight of azodicarbonamide and 0.2 weight percent of p,p'-oxybis (benzene sulfonyl hydrazide). A profile adapted for a 2¼ inch door casing was extruded, using each of the compositions in a Hartig extruder equipped with a two-stage screw especially suitable for extruding poly (vinyl chloride). The extruder had a 2 inch diameter barrel and a length-to-diameter ratio of 24:1. Extrusion was carried out at approximately 350°F. at a rate of 8 linear feet per minute.

The product with no additive weighed 73 grams/ft. while the product with the dihydrazide additive weighed 63 grams/ft., this demonstrating a 14 percent reduction in specific gravity when using the additive.

EXAMPLE 3

This example describes an additional series of runs using the poly (vinyl chloride) of the previous example and the same extrusion system. The amounts of the blowing agent and the dihydrazide additive are shown in the following columns, in each instance the blowing agent used being a 50/50 mixture of the azodicarbonamide and the p,p'-oxybis (benzene sulfonyl hydrazide). The Table also shows the densities obtained.

Table

| Run No. | Blowing Agent, Wt. % | N,N'-diacetyl-adipic dihydrazide, Wt. % | Density |
|---|---|---|---|
| 1 | 0.2 | 0 | 0.85 |
| 2 | 0.2 | 0.05 | 0.75 |
| 3 | 0.2 | 0.10 | 0.70 |
| 4 | 0.4 | 0 | 0.68 |
| 5 | 0.4 | 0.05 | 0.76 |
| 6 | 0.4 | 0.10 | 0.65 |
| 7 | 0.6 | 0 | 0.58 |
| 8 | 0.6 | 0.05 | 0.62 |
| 9 | 0.6 | 0.10 | 0.57 |

This Table illustrates that careful selection of the amounts of the various ingredients must be made to obtain the advantage of this invention. In the above Table, for example, the advantage is probably insignificant at the higher blowing agent levels. Such variations are a function of the blowing agent, the level of dihydrazide, and the particular polymer used. For any combination of these materials, a series of runs such as described in this example will permit selection of the optimum level additive to obtain the desired properties. Such a series of runs is well within the skill of the art.

We claim:

1. In the production of cellular thermoplastic articles wherein the thermoplastic resin is mixed with a blowing agent and heated to activate said blowing agent, the improvement comprising incorporating in said resin in the amount of 0.05 to 0.6 weight percent based on the resin, a dihydrazide of the formula R—CO—NH—NH—CO—$(CH_2)_n$—CO—NH—NH—CO—R', where R and R' independently are alkyl groups containing up to 4 carbon atoms and $n$ is an integer of 1 to 8, the addition of said dihydrazide serving to produce a cellular article of reduced specific gravity at a given blowing agent level.

2. The process of claim 1 wherein the blowing agent is p,p'-oxybis (benzene sulfonyl hydrazide) or azodicarbonamide.

3. The process of claim 1 wherein said resin is polypropylene or poly (vinyl chloride) and said dihydrazide is N,N'-diacetyl-adipic dihydrazide, the latter being present in an amount of 0.05 to 0.6 weight percent based on the resin.

4. The process of claim 1 wherein said resin is polypropylene and said dihydrazide is N,N'-diacetyl-adipic dihydrazide, the latter being present in an amount of 0.05 to 0.3 weight percent based on the resin.

5. The process of claim 1 wherein said resin is poly (vinyl chloride) and said dihydrazide is N,N'-diacetyl-adipic dihydrazide, the latter being present in an amount of 0.05 to 0.3 weight percent based on the resin.

6. A method of producing cellular insulation on wire which comprises incorporating 0.05 to 0.3 percent by weight of N,N'-diacetyl-adipic dihydrazide into a block polymer composition containing a polypropylene polymer having an ethylene/propylene copolymer block attached, coating the blend with an effective amount of a blowing agent, and extruding the mixture in a wire coating machine at a temperature in the range of 375° to 450°F. to produce a coated wire, said coating being cellular polymer of low specific gravity.

7. The method of claim 6 wherein said blowing agent is azodicarbonamide.

8. A method of producing cellular poly (vinyl chloride) resin which comprises incorporating 0.05 to 0.3 percent by weight of N,N'-diacetyl-adipic dihydrazide into said resin, coating the blend with an effective amount of a blowing agent, and extruding the composition to produce a cellular product of low specific gravity.

9. The process of claim 8 wherein said blowing agent is a mixture of azodicarbonamide and p,p'-oxybis (benzene sulfonyl hydrazide).

* * * * *

UNITED STATES PATENT OFFICE
CERTIFICATE OF CORRECTION

PATENT NO. : 3,876,566
DATED : April 8, 1975
INVENTOR(S) : James A. Koshak and William R. McGuire It is certified that error appears in the above-identified patent and that said Letters Patent are hereby corrected as shown below:

Title "Method Producing Foamed Thermoplastic Compositions" should be - Method Of Producing Foamed Thermoplastic Compositions -.

Col. 2, line 22 - "p,p+" should be - p,p' -.

Col. 2, line 23 - "blowing agents are p,p' used in amounts of" should be - blowing agents are generally used in amounts of -.

Signed and Sealed this second Day of December 1975

[SEAL]

Attest:

RUTH C. MASON
Attesting Officer

C. MARSHALL DANN
Commissioner of Patents and Trademarks